US009280866B2

(12) United States Patent
Nayak et al.

(10) Patent No.: US 9,280,866 B2
(45) Date of Patent: Mar. 8, 2016

(54) SYSTEM AND METHOD FOR ANALYZING AND PREDICTING CASINO KEY PLAY INDICATORS

(75) Inventors: Mukesh Nayak, Las Vegas, NV (US); Anthony Kenitzki, Las Vegas, NV (US); Shrihari Hosahalli, Bangalore (IN)

(73) Assignee: Bally Gaming, Inc., Las Vegas, NV (US)

( * ) Notice: Subject to any disclaimer, the term of this patent is extended or adjusted under 35 U.S.C. 154(b) by 72 days.

(21) Appl. No.: 13/296,472

(22) Filed: Nov. 15, 2011

(65) Prior Publication Data

US 2012/0123567 A1 May 17, 2012

Related U.S. Application Data

(60) Provisional application No. 61/413,624, filed on Nov. 15, 2010.

(51) Int. Cl.
*G06F 19/00* (2011.01)
*G07F 17/32* (2006.01)

(52) U.S. Cl.
CPC .................................. *G07F 17/3223* (2013.01)

(58) Field of Classification Search
None
See application file for complete search history.

(56) References Cited

U.S. PATENT DOCUMENTS 4,947,322 A 8/1990 Tenma et al.
5,452,411 A 9/1995 Hidaka
6,529,888 B1 * 3/2003 Heckerman et al. ............ 706/45
7,805,266 B1 * 9/2010 Dasu et al. ...................... 702/66
7,883,417 B2 * 2/2011 Bruzzese et al. ................ 463/39
8,029,365 B2 * 10/2011 Burke et al. .................... 463/42
2001/0020219 A1 * 9/2001 Kishlock et al. ................ 702/61
2002/0038307 A1 3/2002 Obradovic et al.
2002/0127529 A1 * 9/2002 Cassuto et al. ................ 434/335
2002/0152120 A1 10/2002 Howington
2002/0174081 A1 * 11/2002 Charbonneau et al. ......... 706/15
2003/0005371 A1 * 1/2003 Miller .......................... 714/715
2003/0009363 A1 1/2003 Miyoshi et al.
2003/0109308 A1 6/2003 Rowe
2003/0233323 A1 * 12/2003 Bilski et al. ..................... 705/40
2004/0085293 A1 5/2004 Soper et al.
2004/0209690 A1 * 10/2004 Bruzzese et al. ................ 463/39
2006/0147522 A1 * 7/2006 Olmstead et al. ............. 424/464
2006/0217202 A1 * 9/2006 Burke et al. .................... 463/42
2006/0252530 A1 11/2006 Oberberger et al.
2007/0038445 A1 2/2007 Helbing et al.
2007/0112697 A1 * 5/2007 Ricketts .......................... 706/12
2007/0124235 A1 * 5/2007 Chakraborty et al. .......... 705/38
2008/0140348 A1 6/2008 Frank
2009/0327206 A1 * 12/2009 MacLennan et al. ........... 706/59
2010/0057651 A1 * 3/2010 Fung et al. ...................... 706/12

FOREIGN PATENT DOCUMENTS

JP 2006-158706 A 6/2006

* cited by examiner

*Primary Examiner* — Seng H Lim
(74) *Attorney, Agent, or Firm* — Brooke W. Quist; Marvin A. Hein; Philip J. Anderson

(57) ABSTRACT

A gaming system and method is set forth which provides for the predictive analysis of gaming machine performance. In one embodiment, a user may obtain useful predictions of gaming asset performance and may determine assets which should be replaced by using Microsoft® Analysis Services as a component of a predictive.

4 Claims, 16 Drawing Sheets

400

Select Slot Machines to be Retired ×

| ◁ | | Slot Machine Id | Avg. Predicted Coin In | Overall Avg. | Variance | Replacement Slot | |
|---|---|---|---|---|---|---|---|
| | ☑ | W2182098 | $20,725.66 | $25,821.65 | 19.74% | | ... |
| 0_ | ☑ | W2182100 | $14,643.53 | $25,821.65 | 43.29% | | ... |
| | ☐ | W2182101 | $24,997.80 | $25,821.65 | 3.19% | | ... |

Generate Task List

FIG. 10

SYSTEM AND METHOD FOR ANALYZING AND PREDICTING CASINO KEY PLAY INDICATORS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS-REFERENCE TO RELATED APPLICATIONS

This application claims priority to Provisional Application No. 61/413,624 filed on Nov. 15, 2010, which is hereby incorporated by reference in its entirety.

TECHNICAL FIELD

This description relates to systems and methods that may analyze data from the past to predict future performance. More particularly, this description relates to systems and methods that may analyze acquired casino performance data, such as key performance indicators for slot machines, to provide predictive performance data.

BACKGROUND

Modern gaming establishments offer a variety of electronic wagering games including multimedia and/or mechanical slot machines providing video card games, such as poker, blackjack and the like, video keno, video bingo, video pachinko, and various other video or reel-based games. These games, as well as live table games such as Blackjack, Craps, Pai Gow, Baccarat and others, may be linked to a slot system which, by the linkage, acquires data such as coin-in, drop (money spent), coin-out (awards paid), and the like. Such systems are known such as the Bally CMS® system sold by Bally Gaming, Inc. of Las Vegas, Nev.

The data acquired is reviewed to determine the performance of the casino, particular games, floor locations and the like. There continues to be a need to provide statistical prediction of future performance based on this acquired data to assist in the management of the casino, such as changing out slot machine games, moving games, bringing in additional games, and the like. In addition, there continues to be a need to create hypothetical predictions, such as using hypothetical or historical data for games which are not currently on the casino floor.

SUMMARY

Briefly, and in general terms, various embodiments are directed to a gaming system and method for providing predictive analysis for a casino.

In some embodiments, a gaming system and method may provide predictive analysis for a casino floor that includes a plurality of games. Each game may generate historical performance data. This historical performance data may be stored and used to make predictive analyses. In some embodiments, where historical data is absent in a data file for a historical data point, a mean or average for that missing data may be calculated. Using the actual historical data, calculated average, or mean data, the system and method may generate future predictions of the data points. The predictions may be based upon one or both Regressive Moving Average or a Regressive Tree analysis or a blend of both. In some embodiments, boundary conditions may be imposed to disregard predictions that fall below or above certain limits.

In other embodiments, a graphical user interface may provide the user with intuitive tools to use the predictive analysis. Predictive and historical data may be charted and graphed, and specific casino games may be targeted for replacement. Tools may be employed to schedule the replacement of targeted games.

The foregoing summary does not encompass the claimed invention in its entirety, nor are the embodiments intended to be limiting. Rather, the embodiments are provided as mere examples.

BRIEF DESCRIPTION OF THE DRAWINGS

FIG. 10 is a display screen view of a listing of the slot machine which are predictive candidates for retirement.

DETAILED DESCRIPTION

Figure 1:
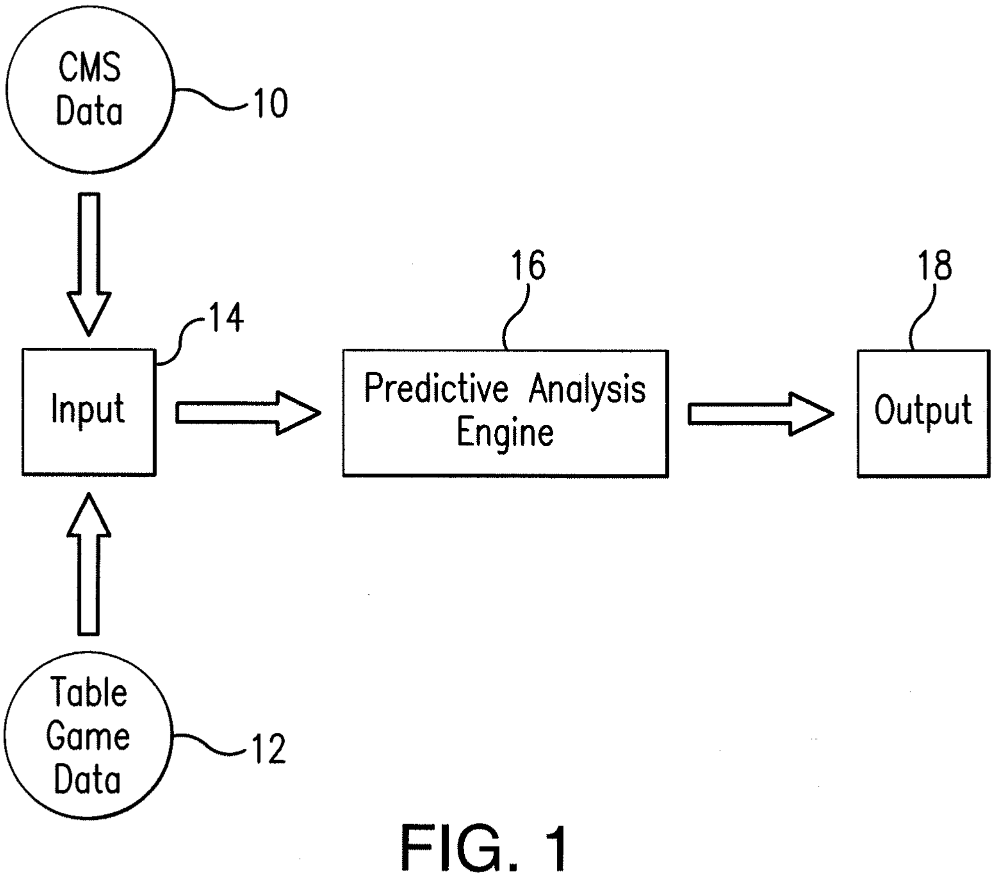
FIG. 1 is a functional diagram illustrating the system and method according to one embodiment.

Referring now to the drawings, wherein like reference numbers denote like or corresponding elements throughout the drawings, and more particularly referring to FIG. 1, there is illustrated a flow diagram for the operation of an embodiment of the method and system for providing predictive analysis for a casino according to one embodiment. At 10 there is provided a source of data such as a casino slot machine/table game management system. The source may be such as the Bally CMS system commercially available from Bally Gaming, Inc. of Las Vegas, Nev. The data may be arranged or is sortable to be arranged, for each data source, on a historical basis such as daily, hourly, or some other or multiple temporal bases. The data may be, for slot machines, coin-in (amounts wagered), coin-out (amounts paid by the slot machine), theoretical hold percentage (which may be selectable at the gaming device), difference between the theoretical hold percentage and the actual hold percentage, handle pulls, duration of play, game name, manufacturer and denomination, or the like. The theoretical hold percentage may be the theoretical percentage from every dollar wagered which is retained by the casino. The data may be stored or sorted by files related to each asset on the casino floor which is typically a slot machine device or live gaming table. A gaming terminal as used herein includes video lottery devices, downloadable game terminals, or the like. As provided above, the data files may be searchable, sortable or stored in historical, temporal data points. The data may be arranged so that it can be retrieved historically and at identifiable time periods such as hourly, by the minute, daily, or the like to define identifiable data points. For example, the data may be hosted on a Microsoft® SQL Server Analytical database.

While the data provided from the CMS data source 10 may include the data related to the identity and performance of a table game, where such data is assembled and stored at another source, such as equipment from another vendor; at 12 there is shown a table game data structure. Again this data would be arranged historically in temporal, identified segments, and include amounts taken in by the table and amounts paid out, the identification of the game type, and an asset identifier. Other data may also be associated with the temporal data points.

At 14 is an input which accesses or provides access to the data points stored in regard to the casino assets. Where the predictive analysis system and method may be incorporated as a tool in an existing CMS system, the method and system may be provided by a separate processor and software engine 16 which may be configured to accept the data for the purposes as hereinafter described.

The predictive analysis engine 16 receives the data, subject to user constraints, and at 18 provides a predictive output. The output may be presented in a graphic and/or textual form. For manipulating the input 14 and viewing the output, the system and method, according to one or more embodiments, may include one or more graphical user interfaces as hereinafter described.

Figure 2:
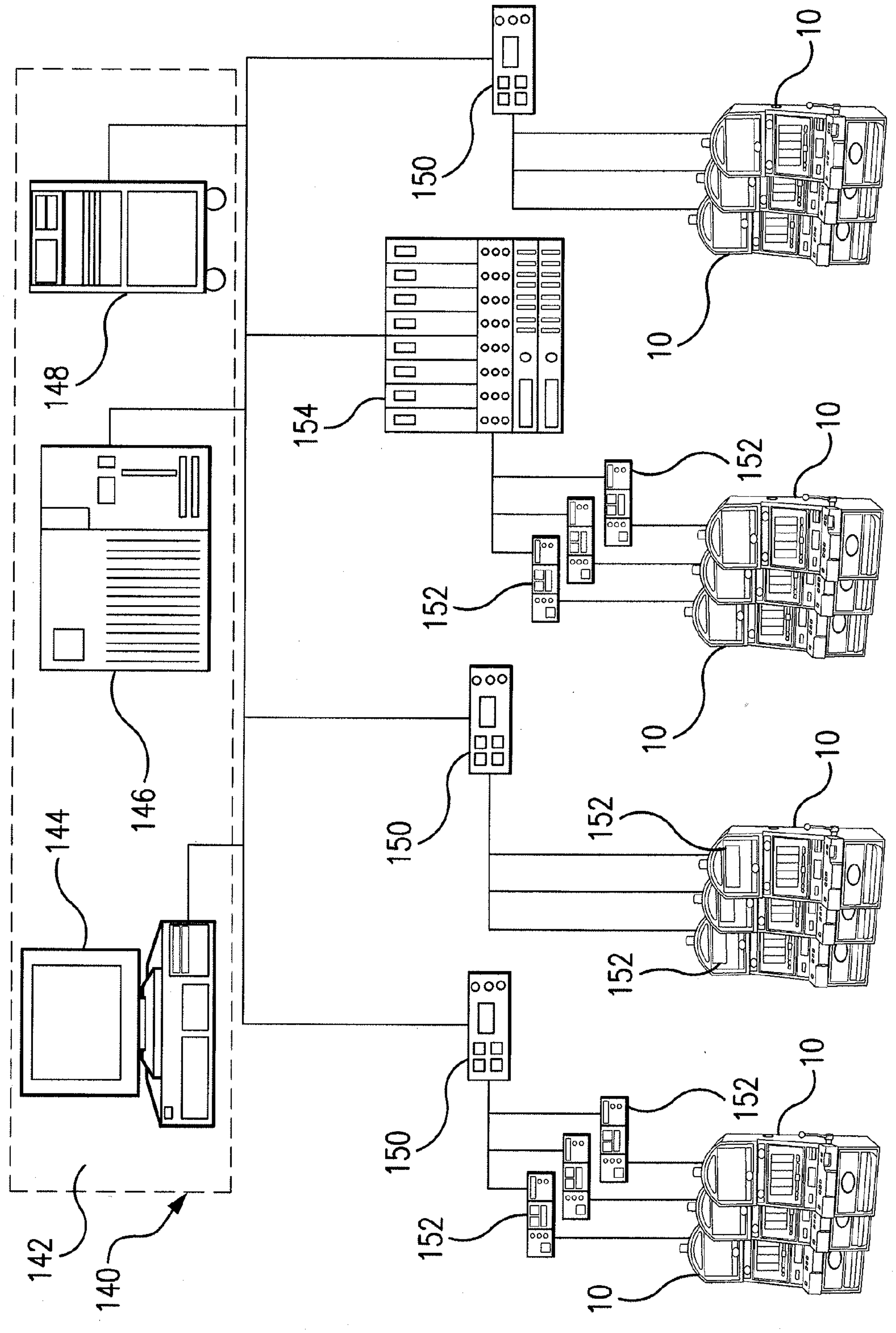
FIG. 2 illustrates a casino management network for a plurality of gaming devices.

FIG. 2 illustrates a casino gaming system 140 that may include one or more gaming devices 100 and one or more servers. Gaming system 140 is the type which gathers and stores the data points referenced above for the gaming devices, and where enabled, table games. Networking components facilitate communications between a backend system 142 and game management unit 152 that controls displays for carousels of gaming devices 100 across a network. Game management units (GMU's) 152 (507 in FIG. 5A) connect the gaming devices 100 to networking components and may be installed in the gaming device housing 102 or external to the gaming device 100. The function of the GMU 152 is similar to the function of a network interface card connected to a desktop personal computer (PC). Some GMU's 152 have much greater capability and can perform such tasks as presenting and playing a game using a display (not shown) operatively connected to the GMU 152. In one embodiment, the GMU 152 may be a separate component located outside the gaming device 100. In another embodiment, the GMU 152 may be located within the gaming device 100 as the player tracking module 110 (FIG. 1). In yet another embodiment, one or more gaming devices 100 may connect directly to a network and may not connect to a GMU 152.

The gaming devices 100 are connected via a network to a network bridge 150, which is used for networking, routing and polling gaming devices, including slot machines. The network bridge 150 connects to the back-end system 142. The gaming devices 100 may connect to the network via a network rack 154, which provides for a few numbers of connections to the back end system 142. Both network bridge 150 and network rack 154 may be classified as middleware and facilitate communications between the back end system 142 and the GMUs 152. The network bridges 150 and network rack 154 may comprise data repositories for storing network performance data. Such performance data may be based on network traffic and other network-related information. The network bridge 804 and the network rack 806 may be interchangeable components. For example, in one embodiment, a casino gaming system may comprise only network bridges 150 and no network racks 154. In another embodiment, a casino gaming system may comprise only network racks 154 and no network bridges 150. Additionally, in an alternative embodiment, a casino gaming system may comprise any combination of one or more network bridges 150 and one or more network racks 154.

Figure 4:
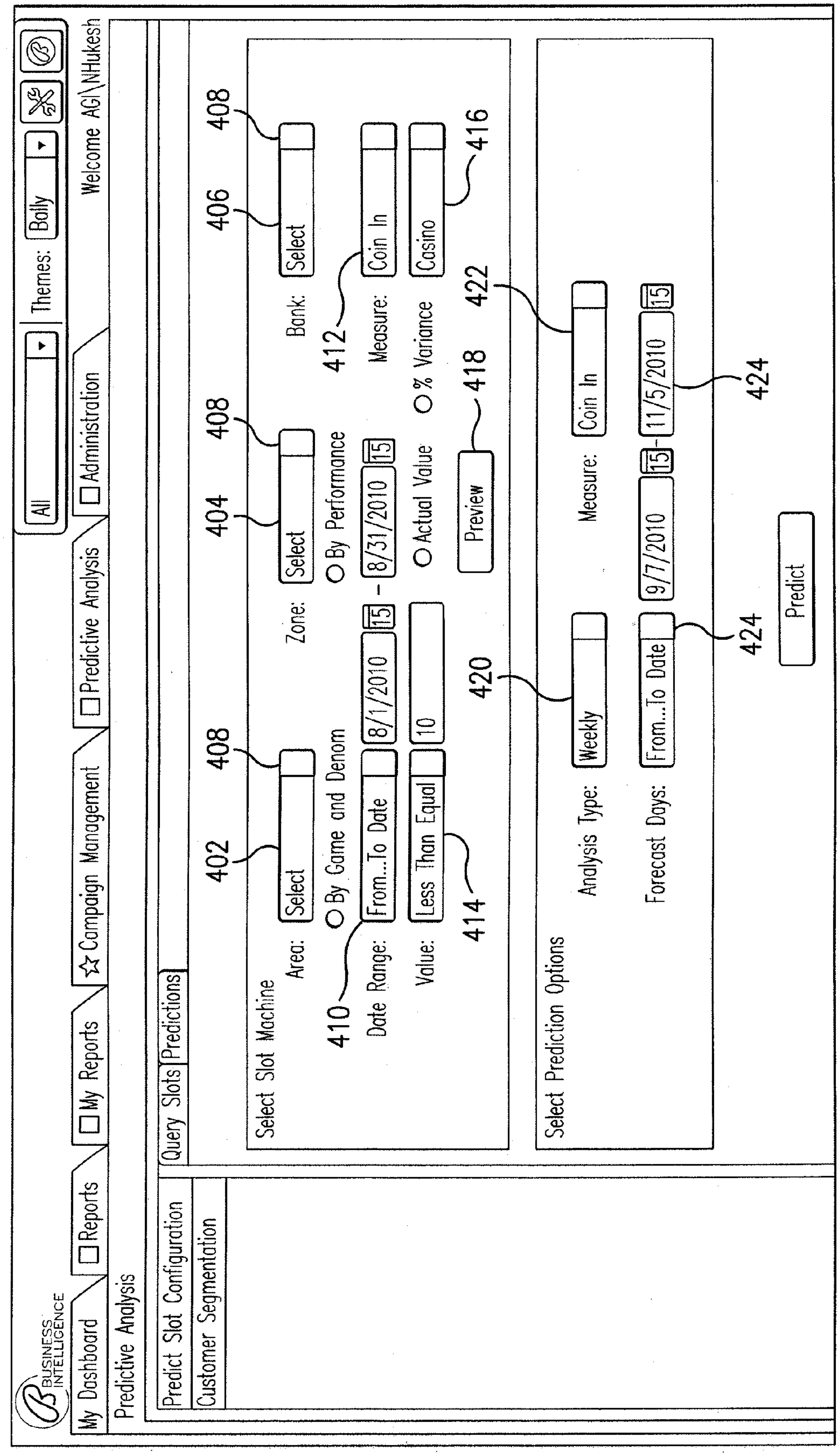
FIG. 4 shows a graphical user interface showing flexible options of selecting slot machines to be analyzed.

The back-end system 142 may be configured to comprise one or more servers as hereinafter described. The type of server employed is generally determined by the platform and software requirements of the gaming system. In one embodiment, as illustrated in FIG. 4, the back-end system 142 may be configured to include three servers: a slot floor controller 144, a casino management server 146 and a casino database 148. As described with reference to FIG. 5, the casino resort enterprise may include other servers. The slot floor controller 144 is a part of the player tracking system for gathering accounting, security and player specific information. The casino management server 146 and casino database 148 work together to store and process information specific to both employees and players. Player-specific information includes, but is not limited to, passwords, biometric identification, player card identification, and biographic data. Additionally, employee specification information may include biographic data, biometric information, job level and rank, passwords, authorization codes and security clearance levels.

Overall, the back-end system 142 performs several functions. For example, the back-end system 142 may collect data from the slot floor as communicated to it from other network components, and maintain the collected data in its database. The back-end system 142 may use slot floor data to generate a report used in casino operation functions. Examples of such reports include, but are not limited to, accounting reports, security reports, and usage reports. The back-end system 142 may also pass data to another server for other functions. In some embodiments, the back-end system 142 may pass data stored on its database to floor hardware for interaction with a game or game player. For example, data such as a game player's name or the amount of a ticket being redeemed at a game may be passed to the floor hardware. Additionally, the back end-system 142 may comprise one or more data repositories for storing data. Examples of types of data stored in the system server data repositories include, but are not limited to, information relating to individual player play data, individual game accounting data, gaming terminal accounting data of the type described above, cashable ticket data, sound data, and optimal display configurations for one or more displays for one or more system game. In certain embodiments, the back-end system 142 may include game download functionality to download and change the game played on the gaming devices 100, provide server based gaming or provide some or all of the data processing (including if desired graphics processing as described herein) to the gaming devices 100.

The predictive analysis engine 16 may include a software tool provided by Microsoft® Analysis Services customized as hereinafter described. In some embodiments, the predictive analysis engine 16 provides for several customizable features. For example, boundary conditions to disregard predictions above or below certain values such as percentages of averages may be customizable and included by setting maximum and minimum series values to remove data spikes. In some embodiments, another customization may be for data points where data is missing or is corrupted: a routine may import the Mean, Median, or other value for the missing or corrupted data as the data points. This configuration may make the predictive analysis more accurate in that data points are not ignored. A further customizable feature may be that the engine can select between various predictive analysis algorithms or may blend them. For example, the user may be able to select between an Auto-Regressive Moving Average (ARIMA) and an Auto-Regressive Tree (ARTxp) analysis algorithm or a blend of both. The selection may be determined by whether the user wishes a short-term or long-term projection. The engine may built on the Microsoft® WCF Web Services platform.

By predicting accurate asset key performance indicators at any point in the future, casino floor performance and revenue may be improved. The core of this application, the engine 16, which uses a variety of statistical auto regression algorithms to analyze asset attribute, finds hidden relationships between historical slot data and performance level and predicts possible arrangements for future dates.

Figure 3A:
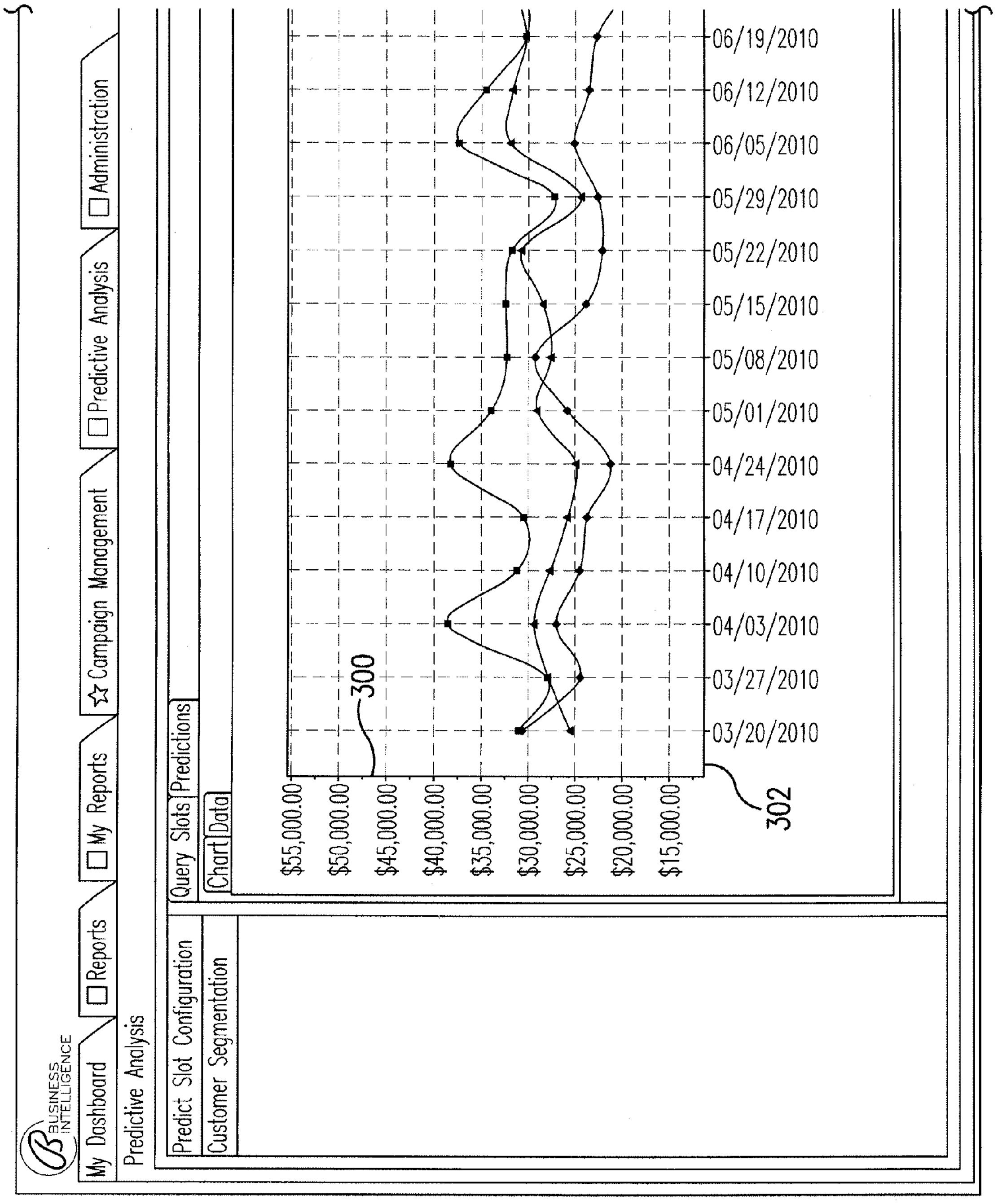
FIG. 3 is a graph showing a predicitive analysis for three slot machines and is based upon coin-in data.
Figure 3B:
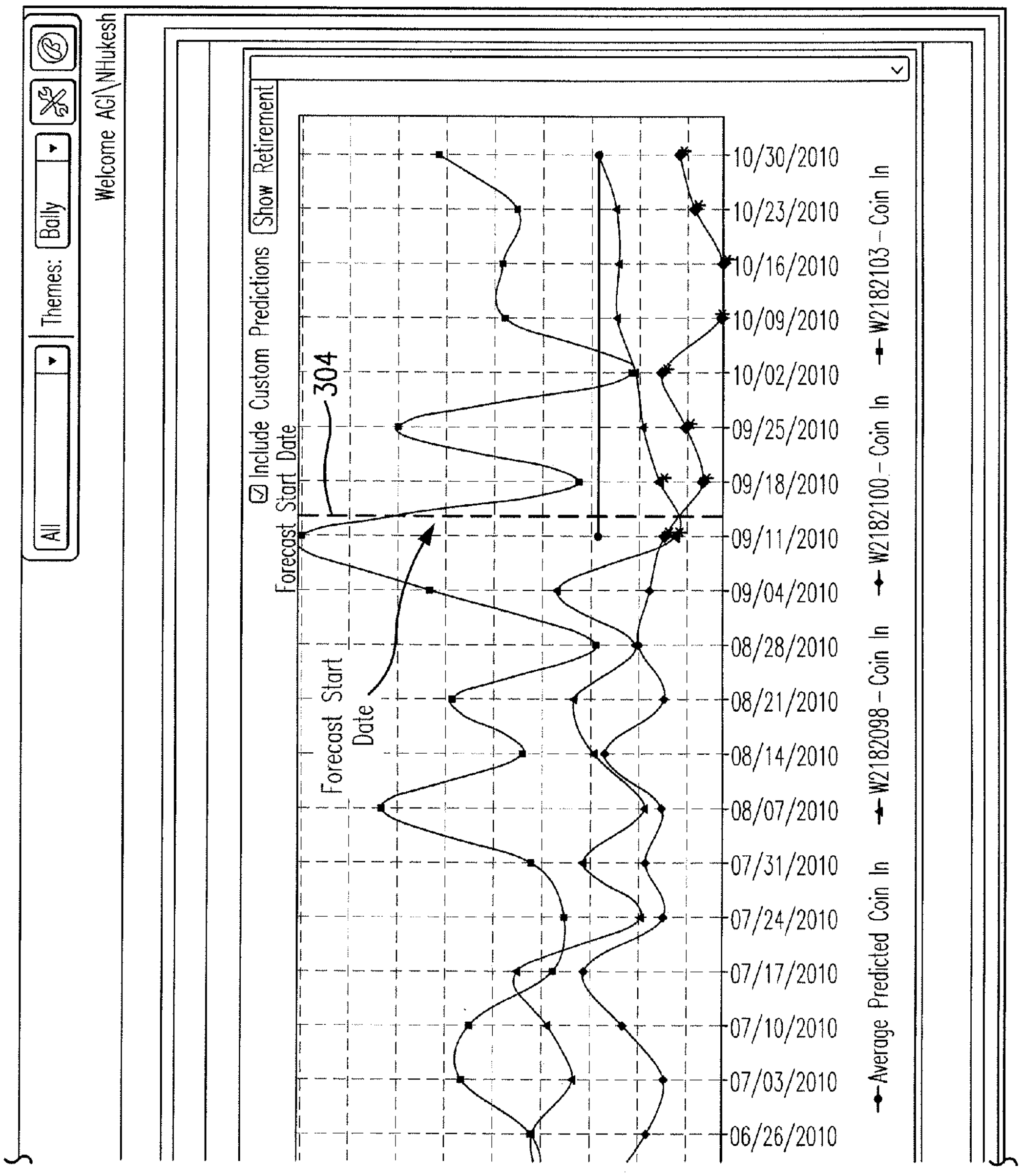

FIG. 3 illustrates a display of an analysis which may be produced by the engine 16. For the input 14, the CMS data structure 10 may be mined to retrieve the weekly coin-in (how much is wagered at a gaming machine over a period of one week). The ordinate 300 is coin-in whereas the abscissa 302 list dates in weeks. The graph illustrates both historical and predictive analysis of coin-in for three selected slot machines. At 304 is a line which indicates to the left actual historical data (or actual data plus calculated Mean data) up to a present date and the right predictive data.

By selecting certain gaming machines by type, denomination, location or the like, predictions may be created by the engine 16. FIG. 4 illustrates a graphical user interface 400 which can be used to guide the user through the configuration of the engine 16 and the nature of the input 14. At 402, the user may select an area, at 404 a zone, or at 406 a bank of gaming machines. By configuring the drop-down menus 408 the user may select from between prior established parameters. At 410, the user may select the date range for the analysis by entering the dates. At 412, the user may select the data, such as coin-in, coin-out or other parameter, as suggested above. Again drop-down menus are provided for convenience. At 414, the user may select a minimum value in combination with a scalar 416 which, in the case illustrated, will ignore data points for assets (gaming machines) which have a coin-in less than or equal to ten percent of the casino average. At 418, the user may preview their selection. For the predictive options the user may select at 420 and the measure at 422, such as coin-in. Additionally, the user may select the forecast period dates at 424.

Figure 5:
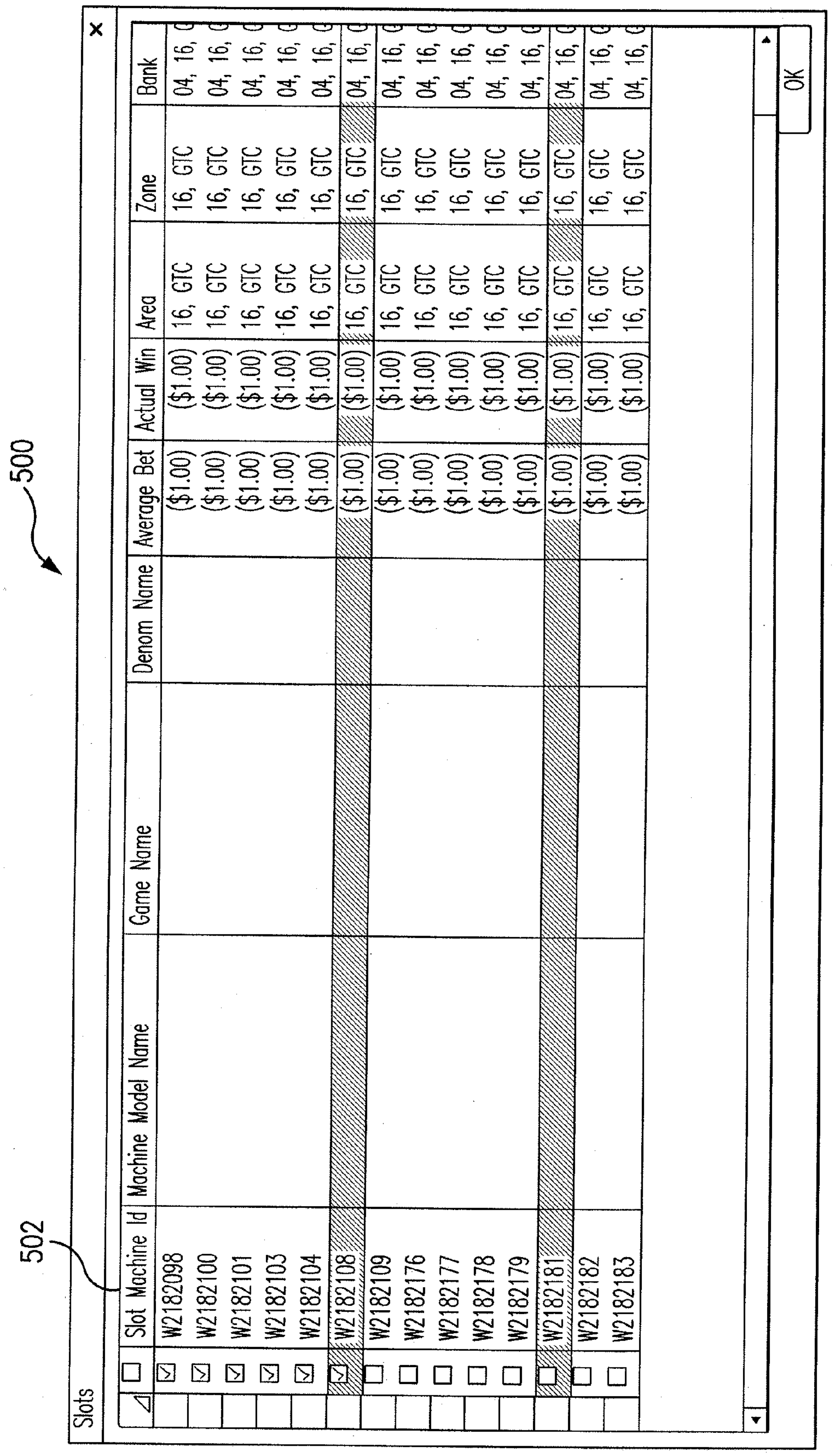
FIG. 5 is a display screen view of a graphical user interface showing a slot machine list returned from the query of FIG. 4.

For the inquiry of FIG. 4, the engine 16 may return a list of gaming machines falling within the scope of the inquiry as suggested in the display 500 of FIG. 5. The listing may include game names and manufacturers (redacted in FIG. 5) as well as the asset identification numbers 502, average wagers and other displayed information.

Predictions may be generated for any future time range and for different temporal periods such as daily, weekly or monthly periods. The predictions may be based upon game denominations or games with certain characteristics, e.g., video Keno games, video poker games, video slot machines, or the like.

Figure 6A:
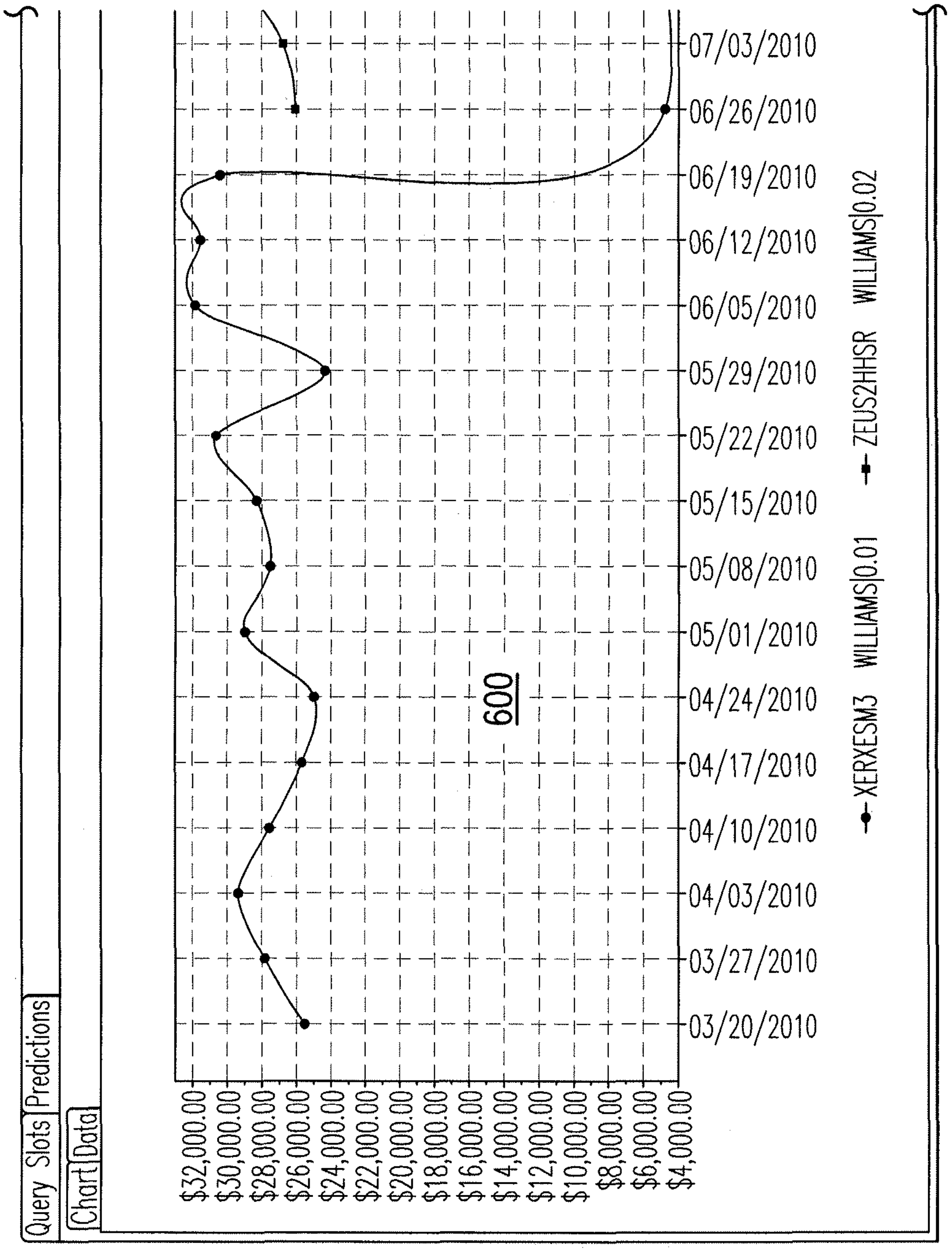
FIG. 6 is a display screen view of a graphical user interface showing a game prediction graph showing the "Show Suggestion" button.
Figure 6B:
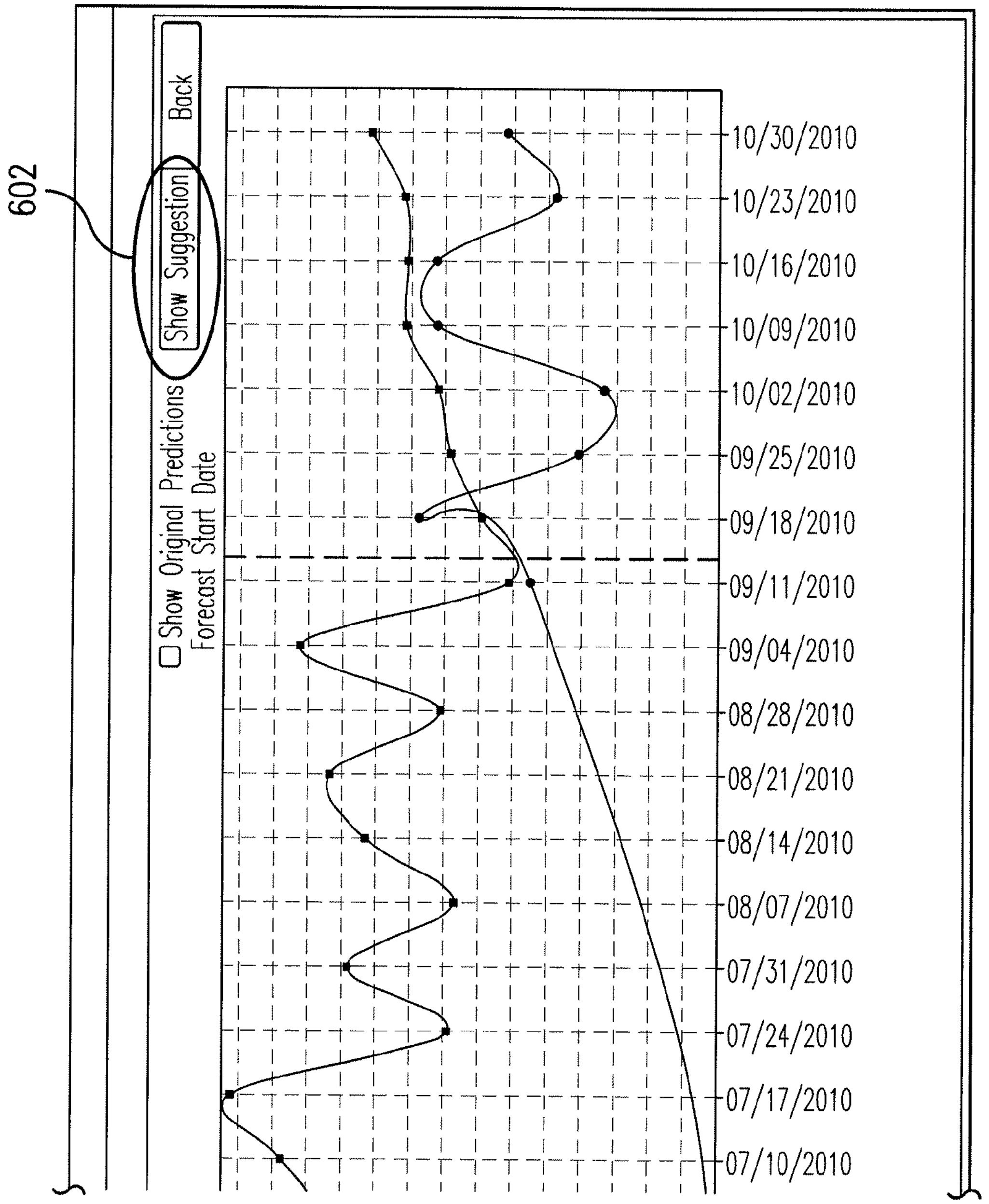
Figure 7:
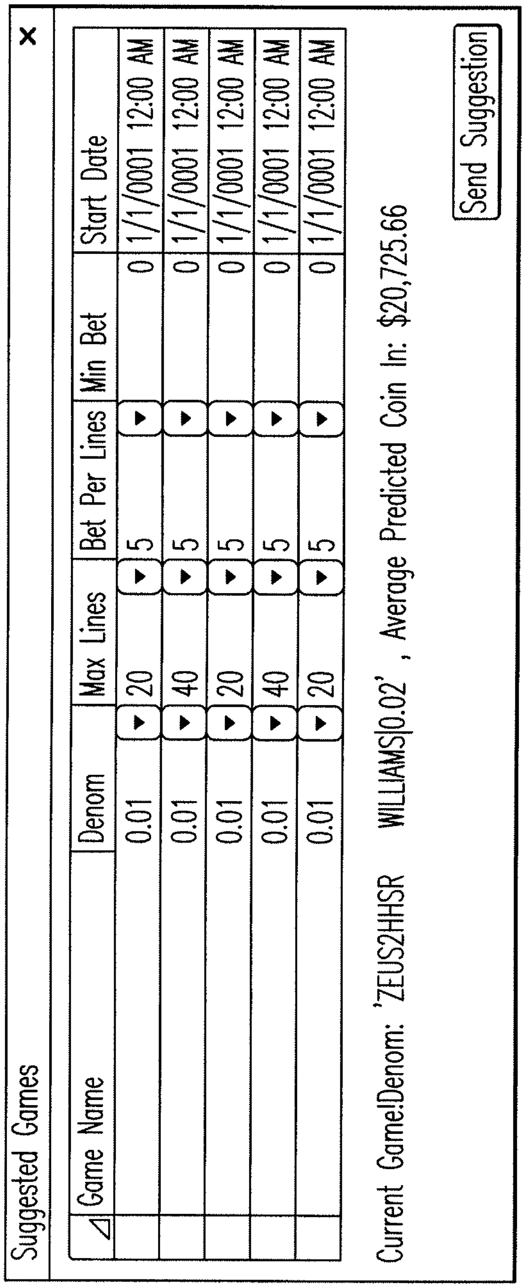
FIG. 7 is a display screen view of a graphical user interface showing a list of suggestions generated by one embodiment.

FIG. 6 shows a user interface graph 600 which includes a suggestion button 602. In environments where the configurations, e.g., the games or denomination or hold percentage can be changed, such as by downloading different configurations or in a server-based gaming environment; the user is enabled to use the suggestion button which may suggest floor or bank configuration changes and how those changes would affect the parameter under scrutiny, i.e., coin-in. Based upon prior histories of the configurations at the same or other locations in the casino or perhaps even data imported from a manufacturer which relates to performance of the configuration or game at other venues can be used to provide the user with future predictions. For example, the user may test certain new games using manufacturer data in the predictive analysis to run through various hypothetical configurations before committing to the purchase of a game or configuration. FIG. 7 shows a list of predictions with the manufacturer game titles redacted. The list indicates the game name, denomination, number of lines, bet per line, minimum bet and a predictive start date'selected by the user.

Figure 8A:
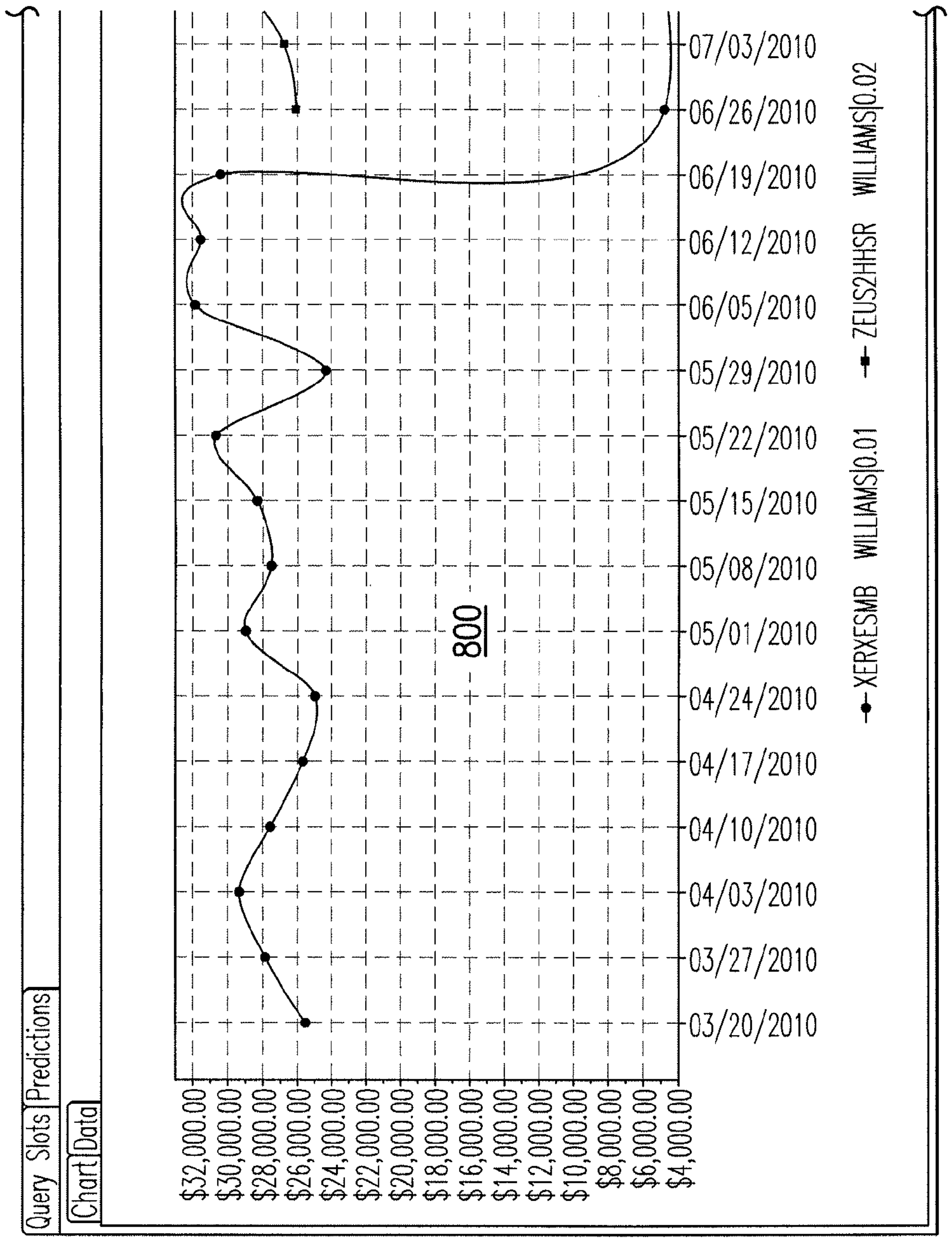
FIG. 8 is a display screen view of a graphical user interface showing interactive charts showing customized and original predictions.
Figure 8B:
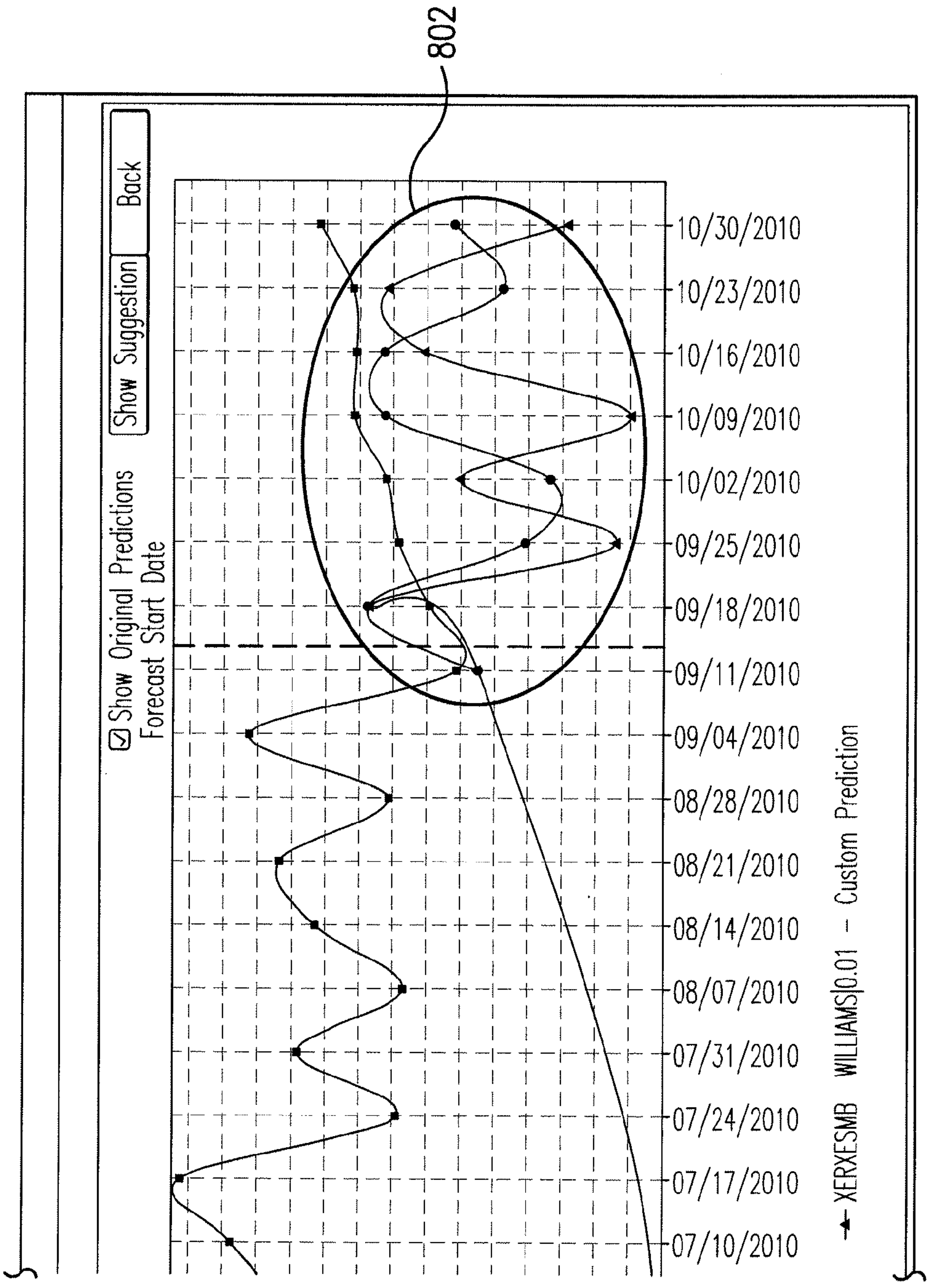

Turning to FIG. 8 there is shown a displayed graph 800 at a user interface, which includes the result of a predictive analysis based upon weekly coin-in. In the embodiment shown, coin-in is in dollar units as the ordinate and time is set in week increments as the abscissa. At 802, there is shown an area of interest where the user can modify the predicted values manually to customize the predictions to see how the modification affects the predictions. For example, the user may wish to determine the effect on coin-in for an area of the casino if certain machines are moved or removed.

Figure 9A:
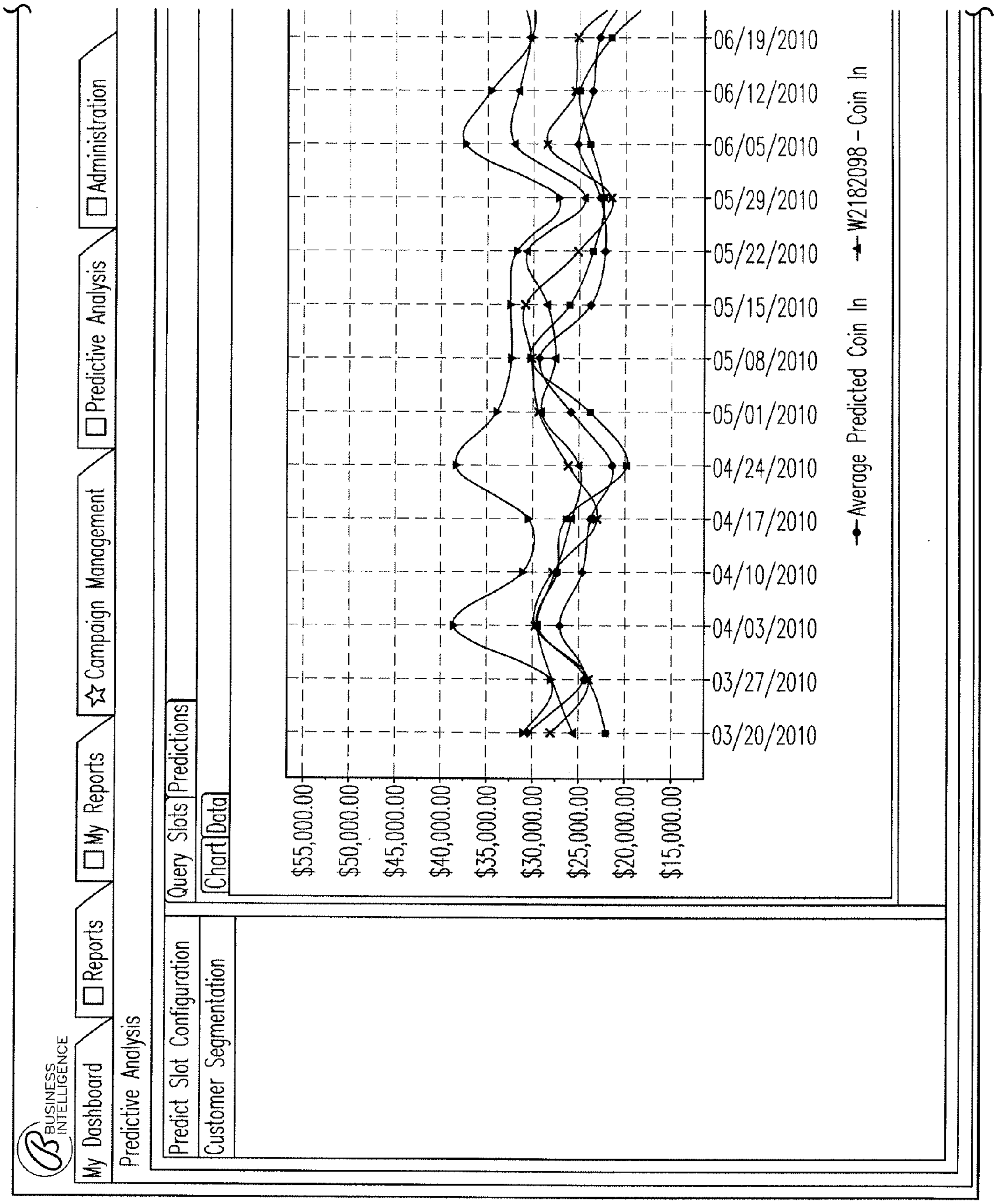
FIG. 9 is a display screen view of a graphical user interface showing slot coin-in predictions for slot machine retirement.
Figure 9B:
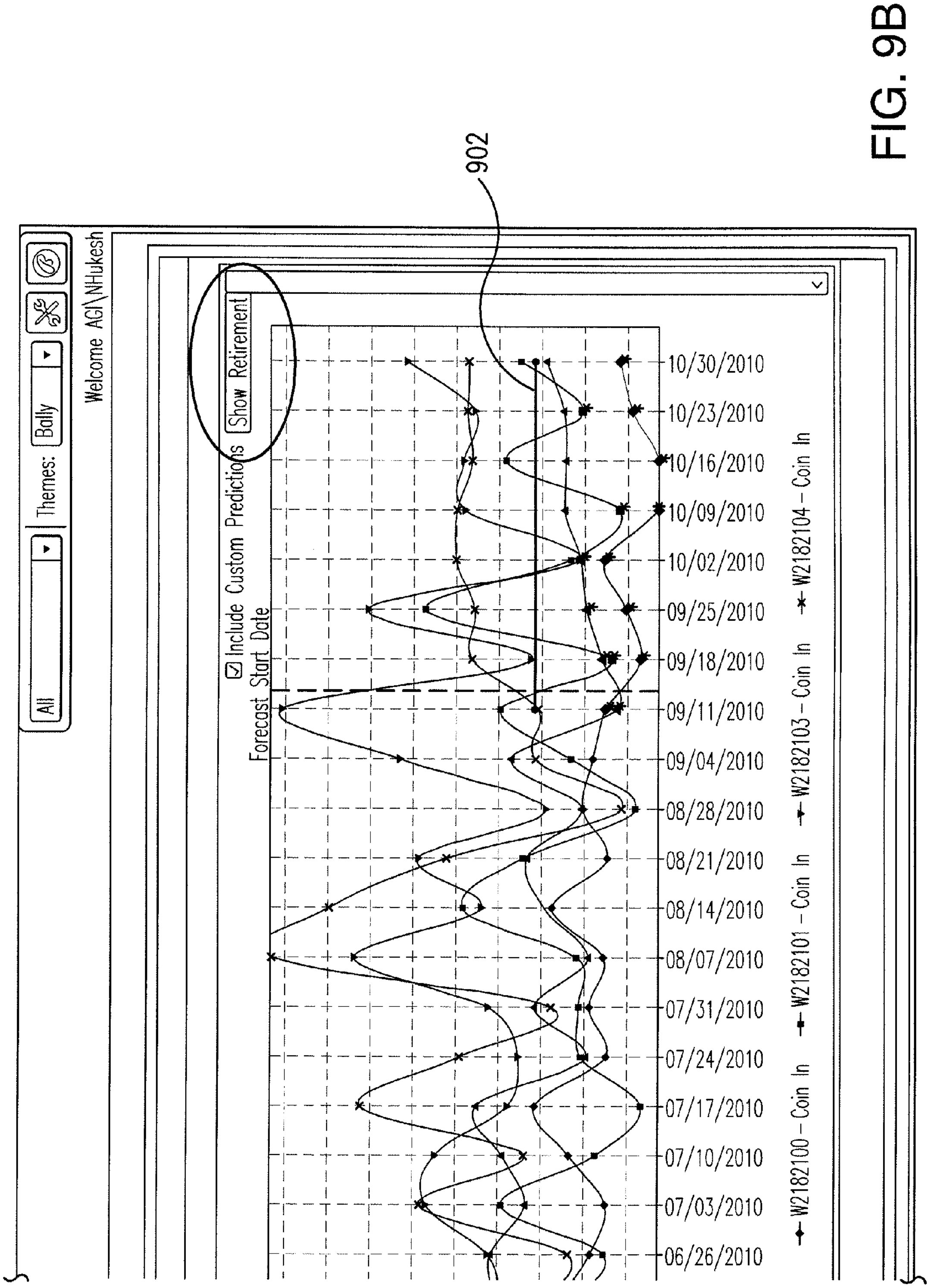

FIGS. 9-12 relate to the prediction of which assets, e.g., slot machines, are candidates for retirement (removal or replacement) and to schedule that removal. FIG. 9 is a displayed user graph 900 which predicts that certain gaming devices will, in the future and based upon prior performance data, have a coin-in performance parameter that will fall below, for example, a floor average 902. At 904 is the current date indicating to the right of that line the prediction portion of the graph. FIG. 10 lists the specific slot machine games which are the predictive candidates for retirement. FIG. 10 provides the predictive numbers showing the overall average as well as the predictive average and the percent variance from the average which targets these assets for retirement.

Figure 11:
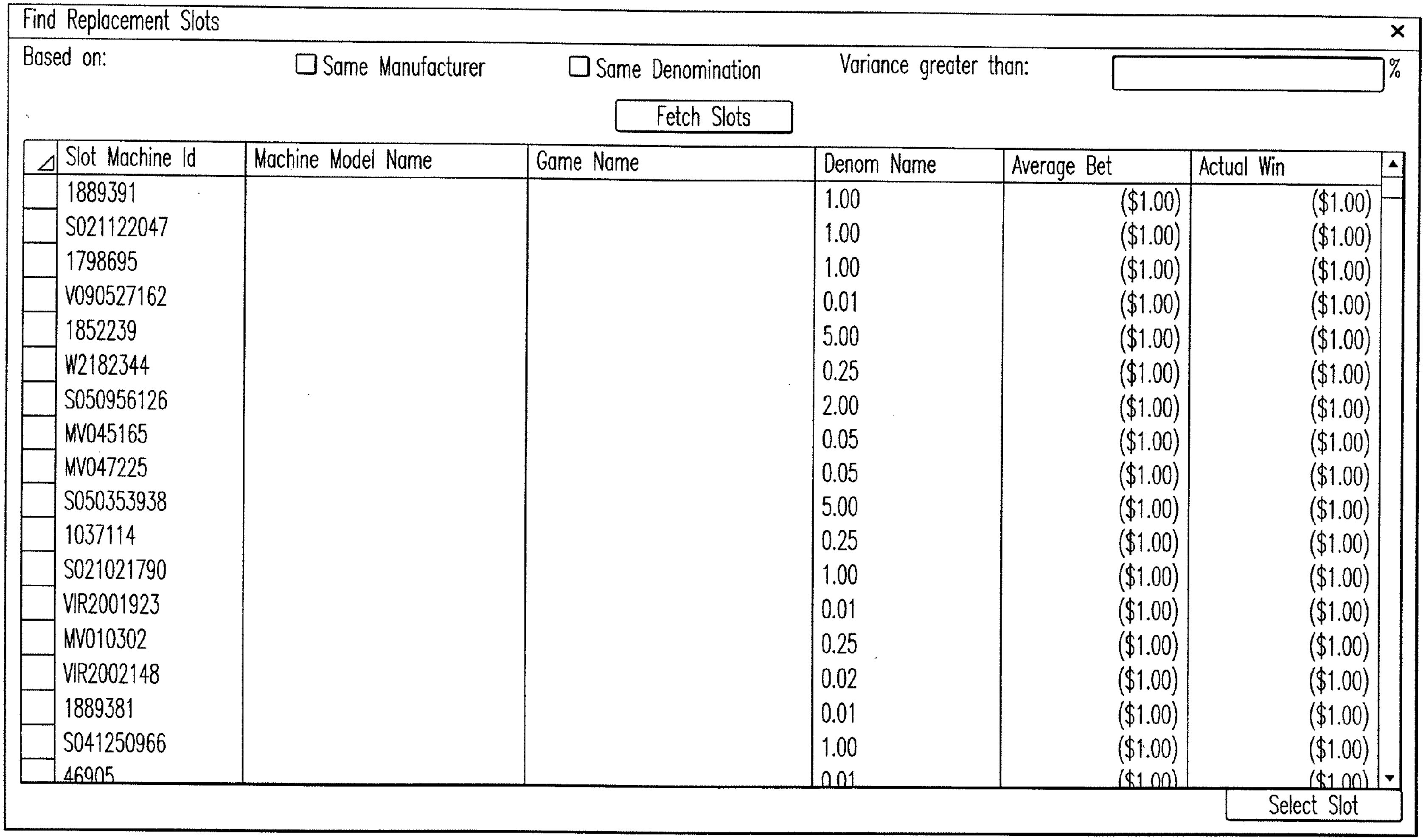
FIG. 11 is a display of suggestions for slot machine replacement based upon the predictive analysis in accordance with one embodiment.

In some embodiments, the predictive analysis system and method may also render suggestions for games to replace those assets targeted for replacement. For example, the casino may have machines which are warehoused which have a prior data record inasmuch as they were previously on the casino floor. In some embodiments, the warehouse may contain machines which are identical to or clones of games which have such historical data. In other embodiments, the manufacturer for any warehoused or potential new game may have data or at least average data or predictive data for these games which may be imported into the CMS data structure or entered manually by the user. FIG. 11 represents a listing of games (titles and manufacturer's names have been redacted) which may be selected and, during the configuration of the predictive analysis, be used in the place of the machines targeted for retirement. If desired, the system and method with the data for the machines available for replacement may run iterations to derive the best or better replacements for the games to be retired.

Figure 12:
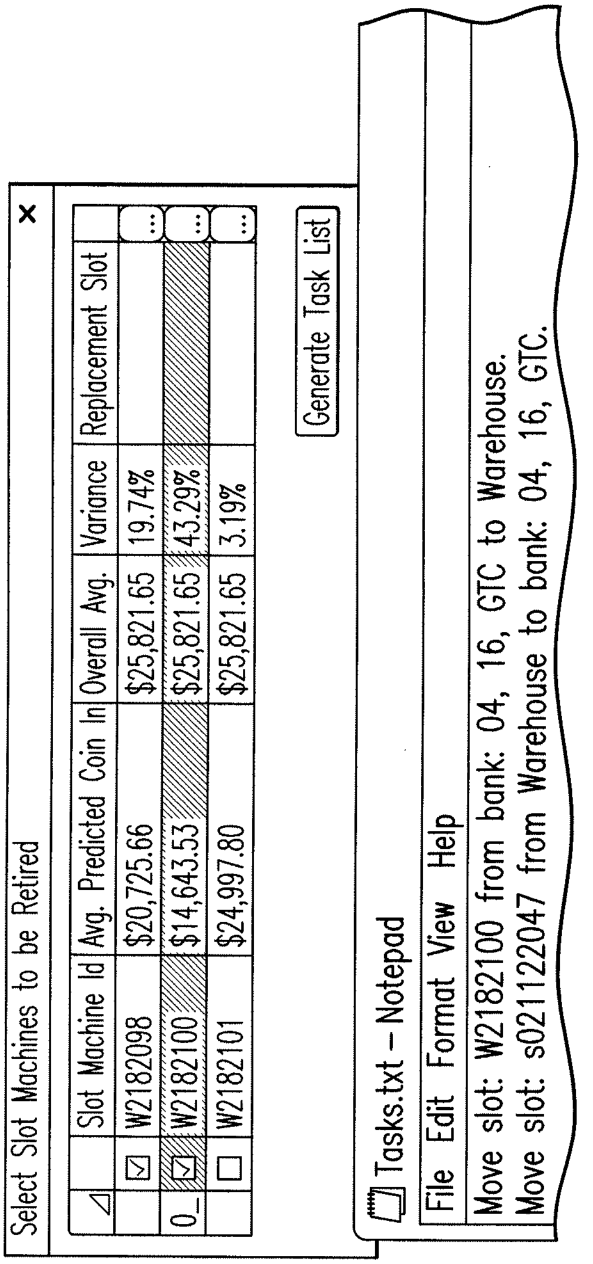
FIG. 12 is a display of a slot machine task list.

As shown in FIG. 12 the system and method may provide a display at a user interface, or broadcast it to a portable device of the machine to be retired, and the machines which will be used to replace them. This message may be sent to the slot tech department to effectuate the exchange.

As an example, a manager of a slot department may want to plan for an upcoming long weekend by making sure his best gaming machine assets are deployed at the right locations on the floor with the most profitable games. Additionally, the manager may also want to determine the worst performing gaming machine assets and find the best possible replacement for such gaming machines. In such a scenario, the manager may select the slot Area/Bank/Zone to be analyzed, or he can select a set of gaming machines that satisfy any user-defined criteria. Once the gaming machines are selected, the user may then select the dates for which he wants the predictions generated.

Once the predictions are generated, the user is able to visually understand how the selected gaming machines would perform in the future time period. The user may then drill down to game performance and send suggestions to any software that can dynamically download a reconfiguration to the gaming machines, e.g., alter the denomination or change the game. The user may also determine the worst performing gaming machines and select candidates to retire. The user may also select the best possible replacement gaming machines from the warehouse based on historic performances of all the gaming machines in the warehouse, as discussed above.

The disclosed system and method may have an XML structure so that it may be integrated with CMS and other tools from various manufacturers. The effectiveness and accuracy of the system and method may be measured by comparing actual data in the future to previous predictions and altering the system and method accordingly to make the predictions more accurate. For example, the differences corresponding to using the Mean, Median, or other value for missing data points may be measured with respect to effectiveness and accuracy. This enables the system and method to determine that the Mean may be more accurate and effective for a first type of data, whereas using the Median may be more accurate and effective for a second type of data.

The various embodiments and examples described above are provided by way of illustration only and should not be construed to limit the claimed invention, nor the scope of the various embodiments and examples. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A method for providing predictive analysis for a casino floor which includes a plurality of gaming devices each generating historical performance data connected to a host processor and a data structure storing the historical performance data over a period of time, the method comprising:
- providing the plurality of gaming devices each comprising:
  - (i) at least one display device;
  - (ii) a plurality of input devices including:
    - (a) an acceptor of a first physical item associated with a first monetary value;
    - (b) a payout device actuatable to cause a payout of an amount awarded to a player from wagered game play;
  - (iii) at least one gaming device processor; and
  - (iv) at least one data storage device storing gaming device software;
- providing the historical performance data to a host processor;
- configuring the host processor to receive the historical performance data as input into a predictive analysis software engine, wherein the engine selects multiple predictive analysis algorithms and blends the algorithms together to provide the predictive analysis;
- determining, based upon the historical performance data, a median value for absent data points in the historical performance data when the absent data points in the historical performance data are missing or corrupted data points; and
- predicting candidate gaming devices from the plurality of gaming devices to remove and suggesting alternative gaming devices to the candidate gaming devices, based upon the historical performance data.

2. The method of claim 1, comprising limiting the prediction by predefined limits.

3. The method of claim 1 comprising selecting one or more predictive parameters selected from the group consisting of coin-in and coin out.

4. A system for providing predictive analysis for a casino floor which includes a plurality of games each generating historical performance data connected to a host processor and a data structure storing the historical performance data over a period of time, the system comprising:
- providing the plurality of gaming devices each comprising:
  - (i) at least one display device;
  - (ii) a plurality of input devices including:
    - (a) an acceptor of a first physical item associated with a first monetary value;
    - (b) a payout device actuatable to cause a payout of an amount awarded to a player from wagered game play;
  - (iii) at least one gaming device processor; and
  - (iv) at least one data storage device storing gaming device software;
- a host data processor;
- a communication network to link the host data processor to one or more of the host processor and the data structure;
- the host data processor configured to:
- receive the historical performance data as input into a predictive analysis software engine, wherein the engine selects multiple various predictive analysis algorithms and blends the algorithms together to provide the predictive analysis,
- determine, based upon the historical performance data, a median value for absent data points in the historical performance data when the absent data points in the historical performance data are missing or corrupted data points; and
- predict candidate gaming devices from the plurality of gaming devices to remove, based upon the historical performance data.

* * * * *